No. 894,791. PATENTED JULY 28, 1908.
S. BARNETT.
METALLIC PACKING.
APPLICATION FILED FEB. 6, 1906.
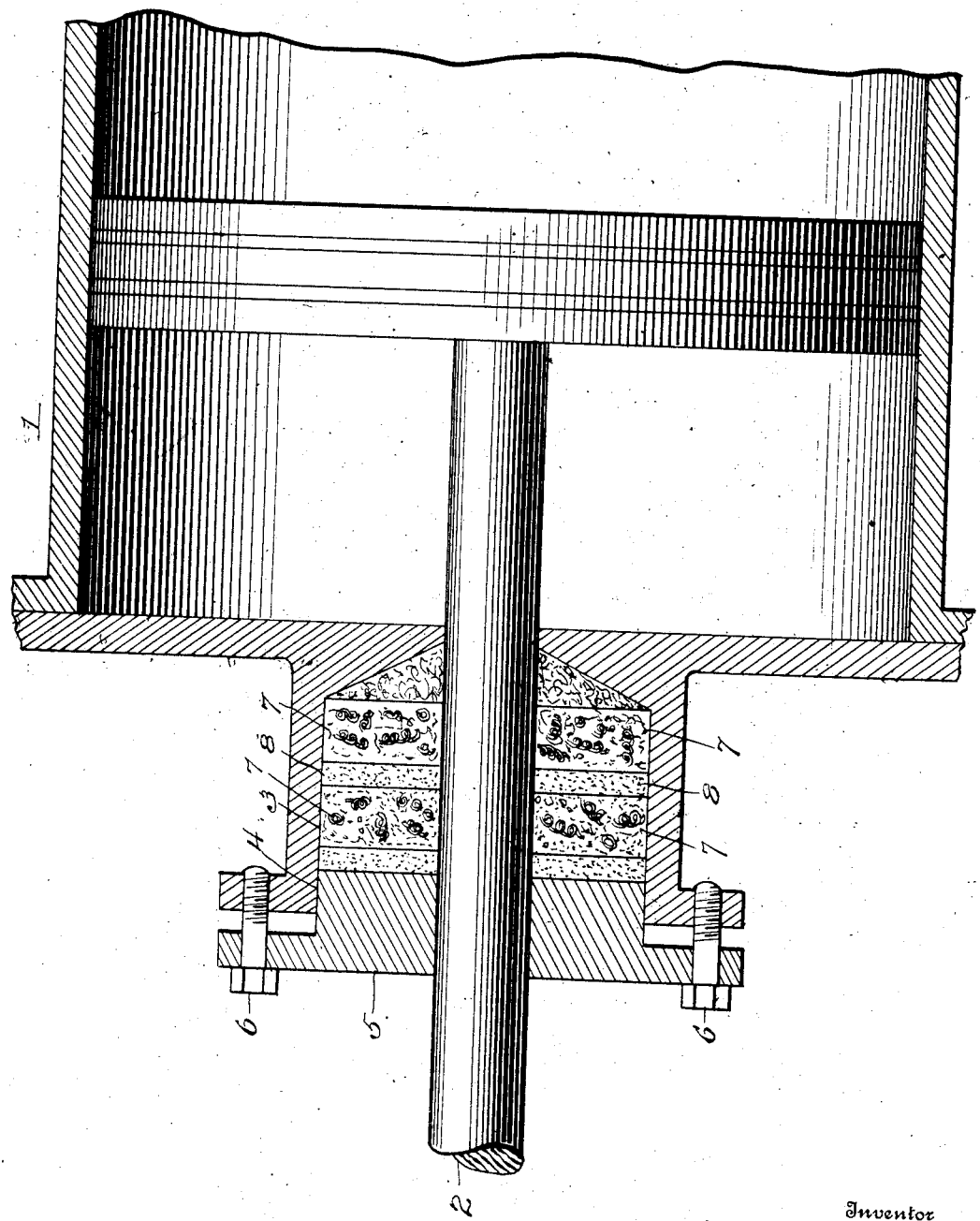
Witnesses
Inventor
Samuel Barnett
By Mason Fenwick & Lawrence
Attorneys

UNITED STATES PATENT OFFICE.

SAMUEL BARNETT, OF PUYALLUP, WASHINGTON.

METALLIC PACKING.

No. 894,791.  Specification of Letters Patent.  Patented July 28, 1908.

Application filed February 6, 1906. Serial No. 299,773.

*To all whom it may concern:*

Be it known that I, SAMUEL BARNETT, a citizen of the United States, residing at Puyallup, in the county of Pierce and State of Washington, have invented certain new and useful Improvements in Metallic Packing; and I do hereby declare the following to be a full, clear, and exact description of the invention, such as will enable others skilled in the art to which it appertains to make and use the same.

This invention relates to a composition of materials for producing a metallic packing, and has for its object to provide a packing embodying improved features of lubrication and of resisting fluid pressure whereby the packing is especially useful for packing piston rods upon steam or other engines, or similar reciprocating parts.

The drawing represents a longitudinal, sectional view of a conventional packing arranged in association with a cylinder rod or like moving part.

In carrying out my invention I use metallic zinc, lead, tin and copper in approximately equal parts, fused together and formed into pellets or globules in any approved manner, similar to the formation and production of shot or otherwise. Any approved quantity of the material so formed is mixed with approximately fifty per cent. of its weight of brass borings, and with sufficient oiled graphite to form the combined materials into a pasty substance, to which, at any stage, may be added a small amount, as five per cent., of antimonious sulfid. Layers of this material alternate with layers of sawdust.

In use the pasty substance, formed as above described, is packed within the ordinary and usual stuffing box about the piston rod or other reciprocating member, forming thereby a layer or disk of the combined material.

In practice, it has been found desirable to have the inner end of the stuffing box substantially perpendicular to the axis of the piston rod, and, if the stuffing box is provided with a tapered extremity, it is found desirable to fill such tapered extremity by the introduction therein of a lead, brass or other soft metal plate having one side conforming to the conoidal shape of the stuffing box, and its opposite side a plane, which, when introduced into the stuffing box, will be disposed substantially perpendicularly to the piston rod. The aforesaid layer of packing material is then placed upon the lead plate and thereon is disposed a thin layer of elastic material, preferably maple saw-dust, although other elastic or fibrous, or granular material may be substituted therefor. Upon the layer of elastic material is then disposed a second layer of the packing material and the said layers of elastic material and packing material may be duplicated until the stuffing box is filled with a layer of the packing material forming the extreme layer of the completed packing. The ordinary and usual follower is then engaged upon the outer surface of the last-placed layer of packing material, and pressure exerted thereon in any of the usual manners, as by means of screw bolts.

It has been found, by repeated experiments, that packing materials or "babbitt" of tin and lead, or zinc and lead, or all three of the said ingredients, combined, produce a packing or "babbitting" which is so soft that at times it adheres to the piston rod, while a packing of brass, is not only expensive but hard enough to wear the reciprocating parts, whereas the combination, heretofore described, is sufficiently hard to prevent adhesion to the rod and sufficiently soft to prevent wearing the rod, while the oiled graphite and the antimonious sulfid produce a perfect lubrication.

The formation of the composition into pellets is found to be of great advantage when used in combination with the brass borings, for the reason that the borings are formed in sinuous or spiral bands into the concavities of which the pellets fit with a considerable degree of nicety, thereby producing a material offering sufficient interstices for the accommodation of the oiled graphite, but presenting sufficient metallic surface to resist the requisite wear.

As represented in the drawings 1 represents conventionally the end of a piston and 2 a piston rod extending through a gland comprising the chamber 3 and pawl 4 carried by a cross head 5, and forced to position by means of screws or bolts 6. Within the gland the metallic packing above described as composed of brass borings, babbitt pellets, antimony, etc. are shown as at 7 with layers of sawdust 8, interposed between such layers. The device as represented in the drawing is shown conventionally as a means for employing the metallic packing described and claimed.

What I claim is:—

A metallic packing, comprising alternate layers, one of said layers comprising sawdust and the other comprising a mixture of pellets of zinc, lead, tin and copper, brass borings, and graphite.

In testimony whereof I affix my signature in presence of two witnesses.

SAMUEL BARNETT.

Witnesses:
EMIL U. STENBERG,
R. H. LUND.